O. G. MAYER.
APPARATUS FOR MANUFACTURING SAUSAGES.
APPLICATION FILED MAY 8, 1919.
1,368,407.
Patented Feb. 15, 1921.
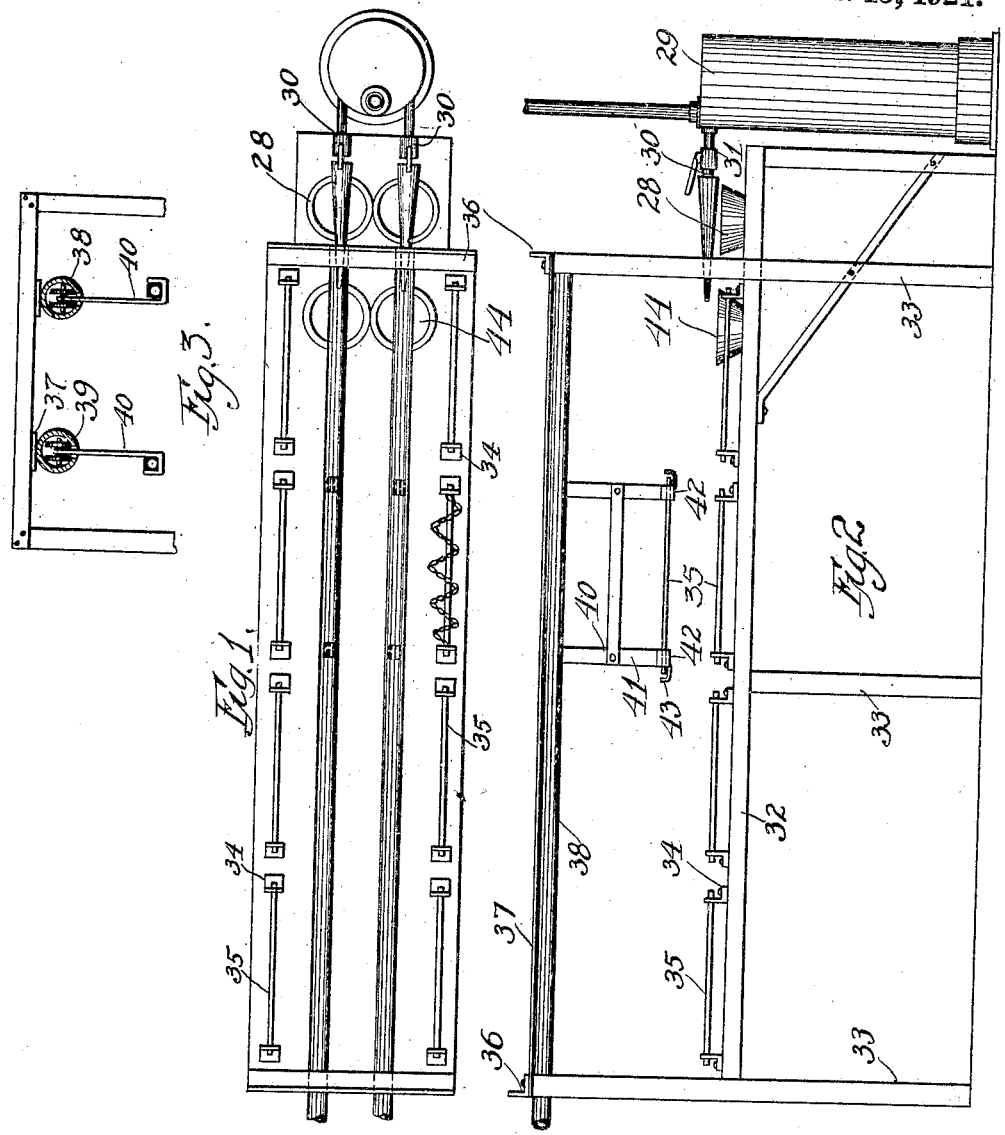
Inventor
OSCAR G. MAYER.
By
Atty

UNITED STATES PATENT OFFICE.

OSCAR G. MAYER, OF CHICAGO, ILLINOIS.

APPARATUS FOR MANUFACTURING SAUSAGES.

1,368,407.   Specification of Letters Patent.   Patented Feb. 15, 1921.

Application filed May 8, 1919. Serial No. 295,614.

*To all whom it may concern:*

Be it known that I, OSCAR G. MAYER, a citizen of the United States, residing at Beethoven Place and Sedgwick street, in the city of Chicago, county of Cook, and State of Illinois, United States of America, have invented certain new and useful Improvements in Apparatus for Manufacturing Sausages, of which the following is a specification.

The invention relates to an apparatus for manufacturing sausages, and its principal object aims at the provision of a working table on which sausage casings discharged from a stuffer may be received, linked and placed in convenient position suitable for transportation, whereby intertwining and distentanglement of the tender sausage casings are practically eliminated.

It is a further object of the invention to provide a working table which has means adjacent the longitudinal edges of the table for supporting linked sausage casings in position suitable for transportation.

A further object embraces the provision of a table on which a plurality of rods are arranged in horizontal position, so that the stuffed sausage casings may be simultaneously linked and arranged on the rod in position ready to undergo further treatment.

Another object aims at the provision of a carriage having means for holding a sausage laden rod in horizontal position, so that a convenient means for transporting the sausages is provided.

To the accomplishment of the objects stated and others that will become apparent upon perusal of the description, the invention comprises the means described in the following specification, particularly pointed out in the claims forming a part thereof and indicated in the drawing, in which Figure 1 is a top plan view of the stuffer and of the work bench arranged in operative relation thereto;

Fig. 2 is a side view of the stuffer and bench as indicated in Fig. 1;

Fig. 3 is a fragmentary cross section of the upper parts shown in Fig. 2.

As indicated in the drawing, a stuffer 29, conventionally indicated, is provided with two nozzles 30 having suitable valves 31 for placing the stuffer into and out of operation. Each nozzle is adapted to receive a spindle charged with casings, so that after a casing adjacent to the tip of the spindle has been filled, the next casing is subsequently filled, and this is repeated until all of the casings on a particular spindle have been stuffed with suitable material. The construction of the stuffer and the parts for placing the same into and out of operation are well known to those versed in the art and further reference thereto is deemed superfluous as not falling within the scope of the present invention.

In conjunction with the stuffer a bench 32 is arranged supported on vertical legs 33 at the ends and intermediate portions. At each side of the bench a plurality of brackets 34 are provided, preferably in the form of angle pieces, with the horizontal leg secured to the table and the vertical leg having a depression at the upper end to permit the removable insertion of rods 35. The rods 35 serve as carriers for linked sausages as will be hereinafter further explained. The corner posts 33 of the bench extend vertically beyond the bench table 32 and are interconnected by transverse members 36, to which longitudinal bars 37 are secured, constituting carrying means for tracks 38, which, as indicated in Fig. 3, are tubular members having at their lower side a slot 39 to permit travel of a carriage, generally designated by 40.

The carriage comprises vertically depending members 41, equipped at the lower end with a hook 42 and end lugs 43 to constitute abutments. It will be obvious that when a rod 35 loaded with linked sausages is placed within the hooks 42, endwise movement of the rod is prevented by the abutments 43. The bench as indicated in Fig. 3, has a pair of tracks 38, each one serving for the appertaining side of the bench so that the loaded rods from either side may be quickly placed onto the carriage to be transported. Attention is called to the fact that each nozzle of the stuffer discharges into a pan 44, the number of casings discharged into the pan depending upon the capacity thereof and the length of the casing.

The working table is used in the following manner: The stuffer is placed in operation such that the casing is discharged from the spindle while being filled with stuffing material, there being pans 44 arranged into which the stuffed casing is discharged. Attention is called to the fact that after a pan 44 has been filled with stuffed casings, it is removed and another pan is placed in operative relation to the stuffer, so that casings are discharged into individual containers eliminating thereby the necessity hitherto prevalent of disentangling stuffed casings which have been indiscriminately discharged onto the bench.

The individual pan 44 having been filled with stuffed casings is then conveyed to a part of the bench 32 in proximity to an operator, where the linking of the casing and loading of the rods 35 are effected. Attention is called to the fact that the working bench may be arranged at a suitable distance removed from the stuffer and that in such case suitable conveying means may be arranged whereby the individual pans may be conveyed to the remote working bench i. e. to selective places thereon. When a pan filled with a stuffed casing reaches the operator the casing can be readily removed from the pan, there being no danger of intertwining or entangling, as the pan contains only a limited number of casings. The stuffed casing is linked and as the links are formed they are laid onto the rod 35 such that, for example, four consecutive sausages depend from one side of the rod and an equal number of consecutive sausages depend from the other side of the rod, the casing being thus balanced on the rod, so that upon elevation of the rod 35 the sausages are carried thereby.

As a matter of practice the fact that individual containers are arranged in proximity to the operator in which one or more filled sausage casings are contained, enables the operator to link the casings as they are withdrawn from the container, and which linking is accompanied by a concurrent depositing of the linked casings on the rod 35 in the manner as mentioned. In other words, an operator is enabled to remove the filled casings from the container, to link the casings and to deposit the same onto a rod, all of which may be effectuated simultaneously or practically simultaneously. It is therefore obvious that by the use of the improved table great convenience is afforded and rapidity of performance is possible which eliminates the waste of time and material and practically completely eliminates disintegration or breaking of the frangible sausage casings.

After sufficient links have been placed on a rod 35 whereby the latter becomes loaded to its capacity, the load together with the sausages is placed in the carriage 40 such that the end portions of the rod are received within the seats provided by the hook portions 42, the abutments 43 preventing endwise movement of the rod and preventing dislocation of the sausages during transport. Upon a slight pressure exerted upon the carriage, the latter together with the loaded rod reaches the discharge end of the bench. There an operator removes the rod together with the sausages, for further treatment.

Special reference is made to the fact that the stuffer discharges the filled casings immediately into individual pans whereby no time is lost in disentangling or finding the ends of the filled casings as the individual discharge makes these unnecessary manipulations and handling of the sausage casings superfluous. It is furthermore of sequence that the stuffed sausage casing is concurrently removed from the pan, linked and placed on a rod which is held in proper position on the bench so that the operator at once is informed when enough links have been formed for one rod and is not required, as in the old method, to pick up at random a plurality of sausage links in the belief that enough sausage links have been seized to fill a rod. A further improvement constitutes the convenient conveyance of the loaded rods to the discharge end of the working bench, where an operator can easily remove the rod and the sausages from the conveyer and place the same subsequent to the bathing on the truck.

It is not my intention of confining myself to the detailed construction and arrangement of parts as shown but to include all changes constituting modifications within the scope of the invention as indicated in the appended claims. I, therefore, claim my invention as broadly as the state of the art permits.

I claim:

1. In combination with a stuffer, an operating table adapted to receive stuffed sausage casings, a plurality of rods horizontally and removably arranged on said table adapted to receive the linked sausage casings, and a carriage slidably supported above said table and having depending means for horizontally carrying a rod.

2. In combination with a stuffer, an operating table adapted to receive stuffed sausage casings, a plurality of rods horizontally and removably arranged on said table adapted to receive the linked sausage casings, a carriage slidably suspended above said rods, and means depending from said carriage for maintaining a rod in horizontal position.

3. A table of the class described, having a plurality of rods horizontally and removably supported thereon, a track supported on said table above said rods, a carriage movable in said track, and means depending from said carriage for maintaining a rod in horizontal position.

4. A table of the class described, having a plurality of rods horizontally and removably supported thereon, a track supported on said table above said rods and extending the entire length of the table and therebeyond, a carriage movable in said track, arms depending from said carriage, and seats to receive the end portions of a rod so as to maintain the latter in horizontal position.

5. A table of the class described, having a plurality of supports thereon, a plurality of rods carried by said supports in horizontal position, a track supported on said table above said rods, a carriage movable in said track, and means suspended from said track for maintaining a rod in horizontal position.

6. A table of the class described, having a plurality of supports thereon, a plurality of rods carried by said supports in horizontal position, a track supported on said table but spaced therefrom, a carriage movable in said track and having means for maintaining a rod in horizontal position.

7. A table of the class described, having a plurality of supports thereon adjacent to the longitudinal edges, a plurality of rods carried by said supports in horizontal position, a track supported on said table but spaced therefrom, a carriage movable in said track and having means for maintaining a rod in horizontal position.

8. A table of the class described, having a plurality of brackets secured thereon adjacent to the longitudinal edges and spaced from one another, said brackets being formed by upright arms having open ended slots, rods received within said slots and carried by said brackets in horizontal position, a track supported on said table in spaced relation but parallel thereto, a carriage movably arranged in said track, and means depending from said carriage for maintaining a rod in horizontal position.

In witness whereof I affix my signature.

OSCAR G. MAYER.